No. 793,483. PATENTED JUNE 27, 1905.
R. WEEKS.
HARNESS.
APPLICATION FILED FEB. 9, 1905.
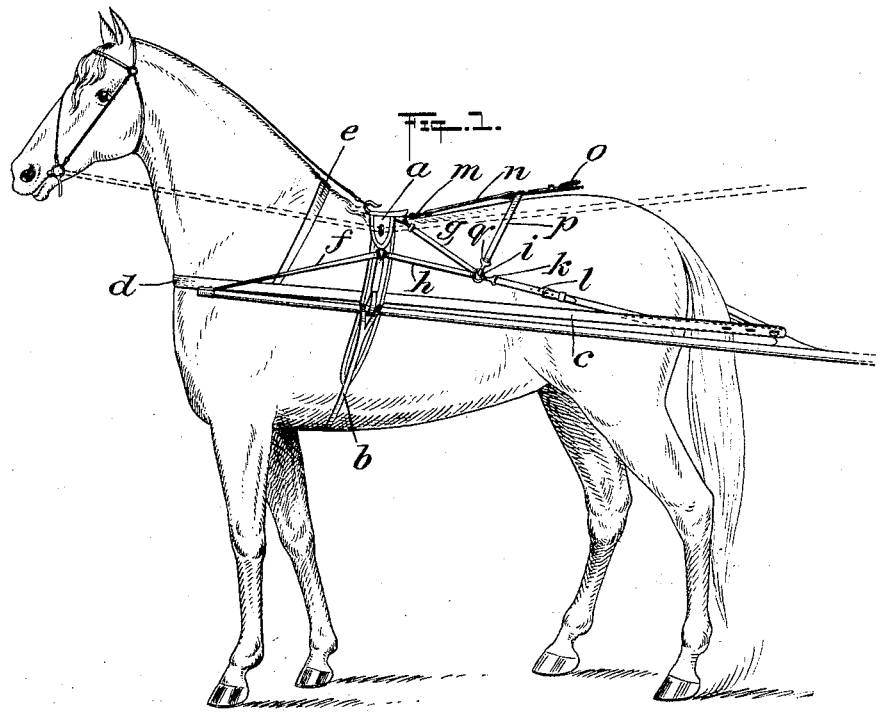
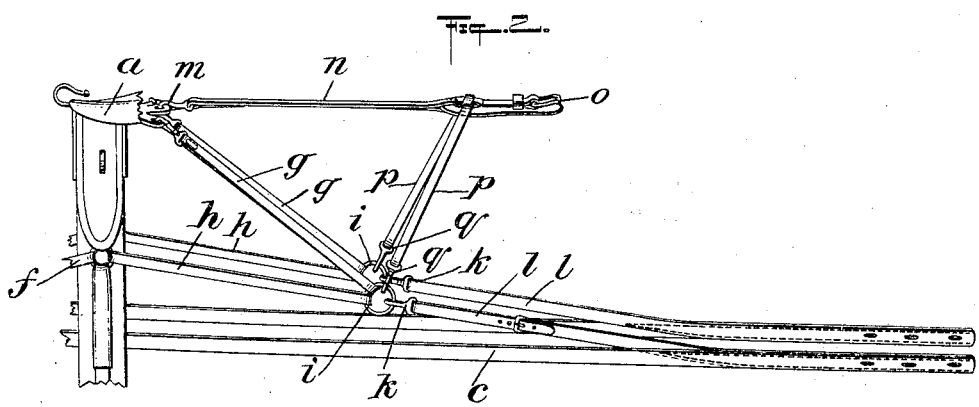
WITNESSES:
INVENTOR
Robert Weeks
BY
ATTORNEYS No. 793,483. Patented June 27, 1905.

UNITED STATES PATENT OFFICE.

ROBERT WEEKS, OF CARMEL, NEW YORK.

HARNESS.

SPECIFICATION forming part of Letters Patent No. 793,483, dated June 27, 1905.

Application filed February 9, 1905. Serial No. 244,924.

*To all whom it may concern:*

Be it known that I, ROBERT WEEKS, a citizen of the United States, and a resident of Carmel, in the county of Putnam and State of New York, have invented a new and Improved Harness, of which the following is a full, clear, and exact description.

The invention relates to harness intended especially for use with light vehicles in track or speedway driving, but is applicable to various other conditions, as will hereinafter appear.

This application constitutes a continuation of my copending case, Serial No. 224,254, filed September 13, 1904; and the present improvements provide for the use of a breast-collar, enabling the horse to draw heavier loads than with the draft from the saddle or belly-band alone, as in my copending case, and I also provide a means for supporting hopples for pacers and other attachments to the hind quarters of a horse.

Reference is now had to the accompanying drawings, which illustrate, as an example, the preferred embodiment of my invention, in which—

Figure 1 is a view showing the harness in position on a horse, and Fig. 2 is a detail view of the rear part of the harness on a large scale.

$a$ represents the saddle, and $b$ the belly-band, of the harness. The traces $c$ are adapted to be connected to the whiffletree in the usual manner and are connected with a breast-collar $d$, as shown in Fig. 1.

$e$ indicates a strap which passes over the shoulder of the horse to support the collar in place.

Holdback-straps $f$ are attached to the front ends of the shafts of the vehicle and extend rearward to and are connected with the saddle $a$, as shown. Two straps $g$ and $h$ pass from the saddle rearward to a ring $i$, and this ring is connected by a snap-hook $k$ to a draft-strap $l$, which extends rearward to and is stitched or otherwise fastened to the adjacent trace $c$. The parts $f$, $g$, $h$, $i$, $k$, and $l$ are of course duplicated on each side of the horse.

Connected to the saddle $a$ by a snap-hook $m$ is a strap $n$, which passes rearward along the back of the horse and terminates in a buckle $o$. From each side of the strap $n$ side straps $p$ extend downward and are provided with snap-hooks $q$, connecting them with the ring $i$.

Now with this harness the strain is distributed between the breast-collar and the saddle, the principal draft being borne by the breast-collar, and the draft on the saddle serving not only to assist in drawing the vehicle, but also to counteract the tension exerted by the check-rein, which is connected with the saddle in the usual manner. The pull on the traces $c$ and straps $l$ is communicated to the whiffletree of the vehicle by the connection of said traces and straps together, as before described. By means of the buckle $o$ hopples for a pacer or various other hind-quarter attachments suiting the character of the horse may be held in place, the strap $n$ preventing the rearward displacement, while the side straps $p$ prevent side displacement.

This harness is practically a rig for racing or speeding horses where lightness is required; but it is intended to permit of heavier straps than are applicable to the racing-harness shown in my copending application above referred to.

Various changes in the form, proportion, and details of my invention may be resorted to at will without departing from the spirit and scope thereof. Hence I consider myself entitled to all such variations as may lie within the intent of my claims.

Having thus described my invention, I claim as new and desire to secure by Letters Patent—

1. A harness having a breast-collar and traces, a saddle, and means extending rearward from the saddle and connected with the traces.

2. A harness having a breast-collar and traces, a saddle, straps extending forward from the saddle for connection with the ends of the shafts of the vehicle, and straps extending from the saddle rearward to and connected with the traces.

3. A harness comprising a breast-collar and traces, a saddle, straps extending forward from the saddle for connection with the ends of the shafts of the vehicle, two straps at each side of the harness extending from the saddle rearward, and straps connected with each pair of the last-named straps and extending rearward to the respective traces.

4. A harness comprising a breast-collar and traces, a saddle, straps extending forward from the saddle for connection with the ends of the shafts of the vehicle, two straps at each side of the harness extending from the saddle rearward, straps connected with each pair of the last-named straps and extending rearward to the respective traces, a strap extending along the back of the horse rearward from the saddle, and side straps connected to said rearwardly-extending strap and also connected to parts of the harness whereby to hold said rearwardly-extending strap in place.

5. A harness having a breast-collar and traces, a saddle, straps extending forward from the saddle for connection with the ends of the shafts of the vehicle, two straps at each side of the saddle one strap extending from the top thereof, and the other from the side portion, and side straps extending rearward, a ring joining the rear ends of the last-named straps, and a strap connected with said ring and with the respective traces.

6. A harness having a breast-collar and traces, a saddle, straps extending forward from the saddle for connection with the ends of the shafts of the vehicle, two straps at each side of the saddle one strap extending from the top thereof and the other from the side portion and side straps extending rearward, a ring joining the rear ends of the last-named straps, a strap connected with said ring and with the respective traces, an additional strap joined to the top of the saddle and extending rearward along the back of the horse, and side straps connected to the additional strap and extending downward respectively to said rings.

In testimony whereof I have signed my name to this specification in the presence of two subscribing witnesses.

ROBERT WEEKS.

Witnesses:
WILLIAM H. WEEKS,
EDWARD C. WEEKS.